United States Patent Office 2,721,842
Patented Oct. 25, 1955

2,721,842

COMPOUND FOR CONDITIONING BRAKE LINING

Brack F. Tate, Sparks, Nev.

No Drawing. Application August 14, 1952,
Serial No. 304,443

6 Claims. (Cl. 252—30)

This invention relates to new and useful improvements in a compound to be applied to the lining of vehicle brakes to eliminate squeaks which would otherwise occur when the brakes are applied and also to eliminate "grabbing" upon application of the brakes. At certain stages in the life of a brake lining and brake drum, objectionable conditions sometimes occur as a result of the wear of the respective lining and drum. This condition frequently results in unpleasant noises which occur when the brakes are applied and the lining comes in contact with the drum. It also sometimes causes uneven, spasmodic application of the brakes, a condition commonly referred to as "grabbing." Grabbing is also caused by the presence of grease on the brake drum. The instant invention comprises a compound which may be applied to the brake lining and which eliminates or reduces the undesirable characteristics heretofore described.

The compound which is the subject of this invention has for its principal ingredients iron oxide, a solid lubricant such as graphite, and a binder such as fuller's earth. The compound is applied to the lining in a layer approximately $\frac{1}{64}$" thick. As the brakes are subsequently applied, the compound produces the beneficial effects heretofore described.

The proportions of the ingredients of the compound may be varied within limits hereinafter set forth, but in general for best results equal parts of graphite, iron oxide and fuller's earth mixed with sufficient water to make a thin paste produces the best results. The thickness of the paste desirably is the consistency of face cream cosmetic.

The foregoing objects and advantages of the invention will become apparent from a consideration of the hereinafter described detailed description of the invention.

The preferred brake compound which is the subject of this invention comprises:

*Example 1*

One part by volume of graphite
One part by volume of fuller's earth
One part by volume of iron oxide ($Fe_2O_3$)

These three ingredients are mixed together and diluted with water until a paste having about the consistency of face cream is produced. The compound is applied to the brake lining with a spatula, brush or rag to form a layer about $\frac{1}{64}$" thick.

The foregoing ingredients may be varied within the following limits, as set forth in the following additional examples:

*Example 2*

One part graphite
Two parts fuller's earth
Three parts iron oxide

*Example 3*

Two parts graphite
Three parts fuller's earth
One part iron oxide

*Example 4*

Three parts graphite
One part fuller's earth
Two parts iron oxide

In each of the Examples 2, 3, and 4, sufficient water is added to make a paste as in Example 1. The application of the paste to the brake lining is substantially the same. After application, the conditions which give rise to the undesirable noises and effects which have been described will be found to have been eliminated.

Although the present invention has been described in some detail by way of illustration and example for purposes of clarity of understanding, it is understood that certain changes and modifications may be made within the spirit of the invention and scope of the appended claims.

I claim:

1. A brake compound paste consisting of graphite, iron oxide and fuller's earth, mixed and diluted with water to form a thin paste, and in which the graphite is between one and three parts, the iron oxide is between one and three parts, and the fuller's earth is between one and three parts.

2. A compound according to claim 1 in which the proportions of the solid ingredients are one part graphite, one part fuller's earth, one part iron oxide.

3. A compound according to claim 1 in which the proportions of the solid ingredients are one part graphite, two parts fuller's earth, three parts iron oxide.

4. A compound according to claim 1 in which the proportions of the solid ingredients are two parts graphite, three parts fuller's earth, one part iron oxide.

5. A compound according to claim 1 in which the proportions of the solid ingredients are three parts graphite, one part fuller's earth, two parts iron oxide.

6. A brake compound for application to braking surfaces for eliminating squeaking and grabbing of the brakes consisting of between 16 and 50 percent by volume graphite, between 16 and 50 percent fuller's earth, and between 16 and 50 percent iron oxide, mixed and diluted with water to form a paste.

References Cited in the file of this patent

UNITED STATES PATENTS 384,920   Mayall et al. _____ June 19, 1888

OTHER REFERENCES

Chemical Formulary by Bennett—vol. 1, page 348—Pub. by D. Van Nostrand Co., 250 4th Ave., New York, N. Y., 1933.